Sept. 22, 1953  F. G. DEDEK  2,652,754
PHOTORECORDING MEANS
Filed May 22, 1951

INVENTOR.
FRANK G. DEDEK
BY
Fidler, Crouse + Beardsley
ATTORNEYS

Patented Sept. 22, 1953

2,652,754

UNITED STATES PATENT OFFICE 2,652,754

PHOTORECORDING MEANS

Frank G. Dedek, Detroit, Mich., assignor to Burroughs Corporation, Detroit, Mich., a corporation of Michigan Application May 22, 1951, Serial No. 227,578

5 Claims. (Cl. 95—1.1)

This invention relates to photo-recording means, more particularly photo-recording means especially adapted for use in connection with business machines such, for example, as calculating and accounting machines, and with other apparatus, such as utility meters having means for indicating amounts and/or other data. A calculating machine, as is well known, ordinarily includes visual indicators for indicating amounts and other data. The photo-recording means of the present invention when applied to a calculating or the like machine is adapted to record such data indicated by the indicators.

The invention also encompasses a photo-recording means having visual indicators included as a part of the structure thereof, that can be applied to any device or machine not having such visual indicators but being capable of operating the indicators of the photo-recording means.

An object of the invention is the provision of a photo-recording means of the character referred to that can be applied to any device or machine either having visual indicators or capable of operating visual indicators when the latter are connected with it, and, when so applied, is adapted to record the data indicated by the indicators.

A further object is the provision of photo-recording means of the character referred to adapted for use in conjunction with a calculating or the like machine having indicators movable into various positions for indicating desired successive items and/or results wherein photo-recording of the indicated data is effected by illumination of such indicators for such a short period that recording can be effected without bringing the indicators to a full stop.

Another object is the provision of a photo-recording means of the nature referred to, employing a light-sensitive medium effectively sensitive only to light of a wave length not normally present in any substantial amounts in the light used for lighting work spaces, thereby eliminating the necessity for shielding the device against the light used for lighting work spaces.

Other objects will be apparent upon reference to the following description taken in conjunction with the accompanying drawings in which.

Figure 2:
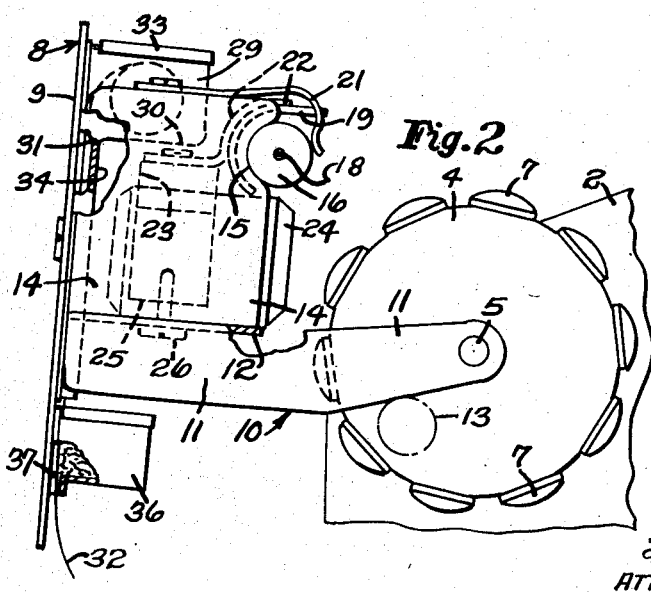
Fig. 2 is a side view of the photo-recording device mounted on a calculating machine, a portion of the calculating machine being illustrated.

In Fig. 2, a photo-recording means in accordance with the present invention is shown, by way of example, as applied to a calculating machine of the kind disclosed in the Pasinski Patent No. 2,240,797 having frame plates 2 upon which the recording device is suitably supported. The dial wheels 4 may be either the usual item and/or result indicating wheels (such as the wheels 47 of the Pasinski patent) driven in any suitable way from the amount entering means or the computing mechanism of the machine, or they may be added dial wheels arranged to be driven by pinions (such as the pinions 44 of the Pasinski patent) or other suitable elements forming part of or driven by data entering, storing and/or computing mechanisms of other machines or devices. In any case, there will usually be a series of such dial wheels 4, including one for each of a series of orders, such as the "units," "tens," "hundreds," etc., of the calculating machine or other device to which the invention is applied.

Figure 1:
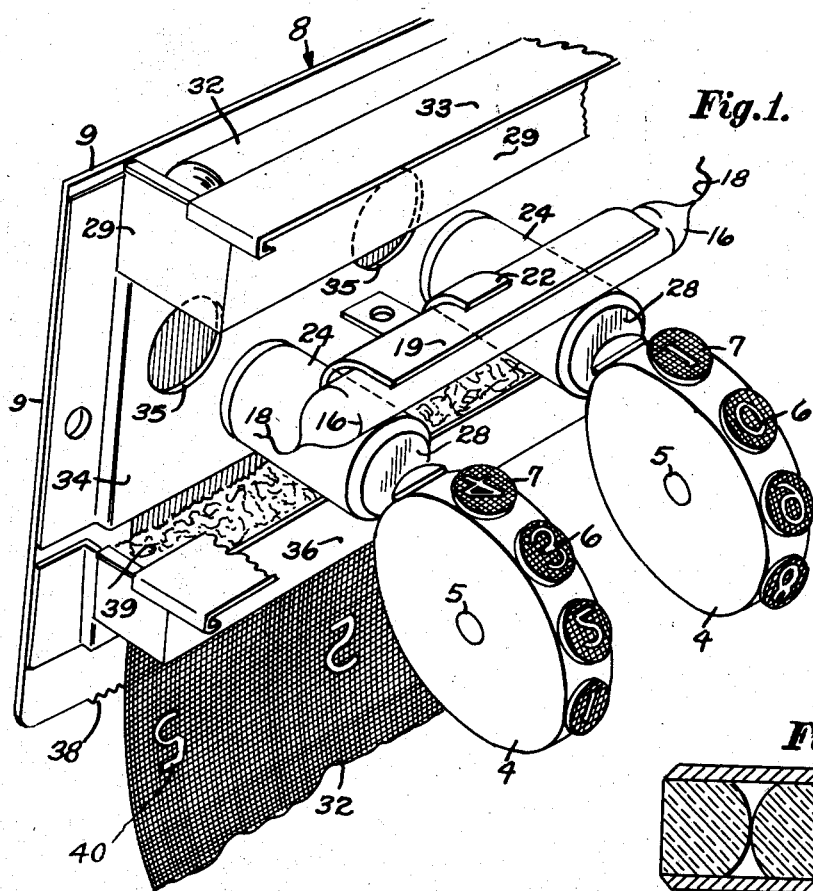
Figure 1 is a partial perspective view of the photo-recording device, with certain parts omitted.

As illustrated in Fig. 1, the dial wheel 4 on the left is the lowest or "units" wheel and that on the right is the next higher or "tens" wheel. Although only two dial wheels are represented in the present illustration, it will be understood that these are merely representative and a greater number of dial wheels may be employed and in fact usually are so employed.

Each of the dial wheels 4 is illustrated as being provided with numerals 0 and 1 to 9, but they may have other characters and a greater or a smaller number of characters thereon. In the present instance, such characters are indicated at 6 and preferably consist of aluminum foil either shaped or masked to represent the respective characters. Aluminum foil is preferably employed for the characters because of its high reflectance for the light employed in the device, as will be explained further in detail. However, reflecting materials other than aluminum foil can be effectively employed. The characters 6 are each covered by a convex lens element 7 composed of a material having a high transmission for the light employed. Each dial wheel 4 is provided with a plurality of circumferentially spaced planar surfaces forming stations or locations on the wheel, the aluminum foil forming the characters 6 being placed on the respective planar surfaces and covered by the lenses 7. The lenses may be secured to the dial wheels in any preferred manner, such as by molding them in position in the manufacture of the dial wheels.

The masking material or materials surrounding the aluminum foil forming the characters 6 is a dark, preferably black, substantially non-reflecting substance whereby only that light striking the aluminum foil will be reflected.

The structure of the device includes a supporting frame indicated generally at 8 for mounting the various elements, the frame having a plate 9 on which is mounted a yoke 10 having a pair of arms 11, one at each side of the plate 9 interconnected by a cross piece 12 which may be integral with the arms or separate therefrom and secured thereto. The arms 11 are of proper length for pivotally mounting their extended ends on the shaft 5 for thereby partially supporting the device on the calculating machine. The shaft 5, in the present illustration, is a part of the calculating machine, because the dial wheels are a part of the machine, but the structure of the photo-recording means itself may be provided with dial wheels and shaft, in which case the shaft will be mounted on appropriate supporting elements of the structure. Studs or stops 13 are mounted on the machine adjacent the sides thereof, e. g., on the frame plates 2, for engagement by the arms 11 and limited downward swinging movement of the arm and supporting the device in appropriate position as represented in Fig. 2.

Figure 4:
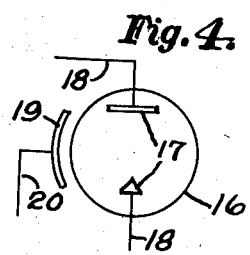
Fig. 4 is a conventional illustration of the three-electrode electronic flash tube employed in the device.

The frame 8 includes vertical side plates 14 (omitted from Fig. 1 for the sake of clarity) composed of insulating material, one being mounted on each of the arms 11 adjacent the respective side of the device. Adjacent the upper portion of the rear edges of the plates 14 are cut-out portions 15 for receiving and locating an electronic flash tube 16 of proper length to extend across all of the dial wheels. Flash tubes are well known and any of the various flash tubes on the market, having the desired characteristics as will be referred to later, may be employed for the purpose. Such a flash tube is illustrated conventionally in Fig. 4 and includes three electrodes, namely, two interior electrodes 17 connected with leads 18 and an exterior electrode 19 connected with lead 20. The exterior electrode 19 is in the form of a shield partially surrounding the flash tube and extending substantially the full length of the main portion thereof. The exterior electrode 19 as illustrated in Figs. 1 and 2 functions as a shield, having a concave reflecting surface for reflecting a portion of the light rays emitted from the flash tube.

A conventional power supply means is utilized for energizing the flash tube 16, and is triggered in a usual manner by means controlled by a key or button on the keyboard of the calculating machine. It is believed unnecessary to further describe the means utilized for lighting the flash tube.

The flash tube 16 as noted in the drawings is positioned for directing light emitted therefrom onto the adjacent ones of the character 6 of the various dial wheels, and more particularly onto those positioned directly above the arms 11 in Fig. 2, which will be referred to as being in a reading line; it will also be noted that the electrode or shield 19 reflects a portion of the light emitted from the flash tube onto the respective character 6.

The cut-out portions 15 locate or position the flash tube 16 which is held in place by spring clips 21, one adjacent each end of the tube and secured to turned-over flanges on the side plates 14. The spring clips 21 permit ready removal of the flash tube. The shield 19 is mounted and positioned by means of one or more brackets 22 secured thereto and to a cross member 23 mounted on the cross piece 12, in a manner to be described presently. The cross member 23 is shown in Fig. 2, but has been omitted from Fig. 1 for purposes of clarity; it includes a plurality of downwardly opening notches having arcuate or curved surfaces at the top for receiving respective ones of the lens assemblies 24, there being one lens assembly for each of the dial wheels 4 and in alignment therewith. The cross member 23 also has downwardly extending projections 25 disposed between adjacent lens assemblies and extending to points adjacent the cross piece 12. Securing means, such as screws 26, are inserted through openings in the cross piece 12 and threaded into tapped holes in the projections 25 for mounting the lens assemblies 24 and cross member 23 on the cross piece 12, the lens assemblies resting on the cross piece whereby the assembled elements are solidly mounted.

Figure 3:
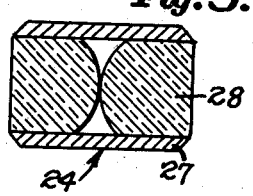
Fig. 3 is a longitudinal sectional view of one of the lenses employed in the device.

Each lens assembly 24 is constructed as illustrated in Fig. 3, having an outer tubular housing 27 and a pair of lens elements 28 fitted therein. The lens elements 28 have convex surfaces on their inner ends, preferably in engagement with each other, and planar outer ends flush with the ends of the tubular housing 27.

The lens assemblies 24 are arranged respectively in alignment with the dial wheels 4 and positioned so that the light reflected from the aluminum foil forming the characters 6, when the latter are in the reading line, is directed through the lenses 28. The lenses are so positioned that their focal points at one end are substantially on the respective characters 6, and at the other end substantially in the plane of the plate 9. The lenses 28 therefore focus the light reflected from the characters and form images of the characters substantially in the plane of the plate 9.

Mounted adjacent the top of the plate 9 on the rear side of the latter is a container 29 extending across the greater part of the plate. The container 29 may be of any desired construction, including side walls and a bottom element 30, the latter being spaced from the plate 9 forming a slot 31. A roll of photo-sensitive paper 32 is supported in the container 29 and arranged for the paper to be drawn downwardly through the slot 31. The container may be enclosed by a cover 33.

The paper 32 extends through the slot 31 and between the plate 9 and another plate 34 secured to the plate 9 and spaced therefrom a slight distance, forming a space for accommodating the paper. The paper when drawn downwardly between the plates 9 and 34 is positioned substantially flat against the plate 9, and thus is disposed in the focal plane of the lenses 28. The plate 34 is provided with an aperture 35 in alignment with each of the lenses 28.

Adjacent the bottom of the plate 34 is another container 36 similar in all respects to the container 29 and provided with a slot 37 for drawing the paper 32 therethrough. The bottom edge of the plate 9 is provided with tear-off teeth 38 for facilitating tearing off portions of the paper when the latter is drawn down below the plate 9. Disposed in the container 36 is a sponge 39 saturated with a developing fluid for developing the photo-sensitive paper 32. The paper on being drawn through the container 36 comes into contact with the solution in the sponge which solution develops that portion of the paper that has not been exposed to the light from the flash tube.

Depending upon the type of calculating machine or other apparatus to which the invention is applied, the dial wheels 4 may indicate individual items entered in the machine, totals accumulated therein, or other data, represented by the characters visible on the dial wheels at the reading line. To record the character 6 at the reading line, the operator of the machine depresses the key or button controlling the flash tube 16, which then produces a high intensity, short duration flash of light. The light generated is directed onto the characters in the reading line and the light is then reflected by the characters through the lenses 28 and onto the photo-sensitive paper through the apertures 35. The light reflected onto the photo-sensitive paper destroys the color forming ability thereof, and in the present instance in patterns representing the respective characters. Thereafter the paper 32 is drawn downwardly whereby the developing fluid in the sponge 39 immediately develops the paper leaving the representations of the characters light colored as indicated at 40, i. e., of the original color of the photo-sensitive paper before it was developed. The shading on the paper 32 in Fig. 1 represents black color, but the particular color is not important, the illustration being intended to represent a dark background relative to light colored characters.

The paper selected is one which is substantially insensitive to daylight and to usual office or workroom lighting. The flash tube or lamp, the character forming material, the masking or surrounding material, the lens material and the paper are selected so that high photo-emission of the lamp, high reflectance of the character forming material, substantially zero reflectance of the masking or surrounding material and high transmission of the lens material coincide with the peak photo-sensitivity of the paper at a wave length in the near ultra violet range for which air has a sufficiently good transmission so that air spaces in the optical system will not greatly affect the efficiency of the combination. By reducing the air gaps in the optical system and with a suitable choice of lamp, character forming material, lens material and paper, light farther in the ultra violet range could be utilized.

As a specific example of the characteristics of the cooperating elements of the photo-recording device, the flash tube 16 produces high intensity of illumination of short duration. The duration of the lighting period of the flash tube is preferably about 1/5000 second. The flash tube produces a substantial amount of illumination in the near ultra violet range and specifically of 3600 angstroms wave length. The aluminum foil used in forming the characters 6 has high reflectance for light of that wave length, and the photo-sensitive paper 32 has a peak sensitivity to illumination of the wave length mentioned. This photo-sensitive paper can be procured on the market as a standard product, one type being that sold by Charles Bruning Co., Inc., and known as "BW paper." It is obvious that the above specific example is not intended to be limiting.

The developing fluid utilized in the device may also be any of the well known developing fluids on the market, one such being the Charles Bruning Co., Inc., product known as "No. 146P." The photo-sensitive paper is a single dye paper coated with diazonium compound effectively sensitive to ultra violet radiation of the wave length mentioned above. The developing fluid includes a diazo dye and a coupler, the developing process being such that the coupler normally produces coupling of the dyes and thereby produces a dark color on that portion of the paper not exposed to the ultra violet radiation.

As mentioned above, the preferred arrangement of the characters 6 is that the characters themselves are formed of light reflecting material and the surrounding material is substantially non-reflecting. It is also contemplated, as an alternative arrangement, that the characters be non-reflecting surrounded by a reflecting background, for producing character recordations on the paper in dark color after development of the paper, surrounded by areas that are not colored but of the original color of the paper.

It is not necessary that the dial wheels 4 be entirely motionless when the flash tube 16 is operated because the lighting period of the flash tube is so short (1/5000 second), that the motion of the dial wheels will not cause any substantial blurring in the representation of the characters on the photo-sensitive paper.

The characters 6 as shown in Fig. 1 are reversed, that is, reversed from side to side. The lenses 28, as will be readily understood, both reverse and invert the images of the characters so that the reflected images or representations of the characters on the photo-sensitive paper are finally disposed as illustrated in Fig. 1 whereby, when the lower portion of the paper is torn off, the characters can be read in the same sequence as the sequence of the orders of the dial wheels 4. For example, in the illustration, the "units" digit 5 represented on the paper is indicated on the "units" dial wheel and the "tens" digit 2 is indicated on the "tens" dial wheel.

Instead of the lens 28 there may be employed a thin, double convex lens having a focal length such that the foci are respectively on character 6 in the reading line, and in the plane of the plate 9. However, when light is employed having such a wave length that it is desirable to reduce the air gaps in the optical system, lens assemblies such as 24 are preferable, because they appreciably reduce the air gap between the characters in the reading line and the photo-sensitive paper.

An advantage incident to the employment of light of the character above referred to its believed apparent—it is unnecessary to enclose the device for shielding the photo-sensitive paper against the light employed for normally lighting the work-room spaces.

While I have herein shown and described a preferred embodiment of the invention, it will be understood that changes can be made therein within the scope of the appended claims.

I claim:

1. In combination with indicating means of the kind comprising visual data-representing characters on indicating members movable to selectively position such characters at a reading line, the combination of a supporting means, an electronic flash tube capable of producing illumination of high intensity and short duration carried by said supporting means close to said reading line in position to illuminate intensely the data-representing characters at said reading line, said flash tube having an exterior electrode partially surrounding said flash tube and forming a shield having a surface for reflecting a portion of the illumination from said flash tube onto the data-representing characters at said reading line, optical means carried by said supporting means, focused on the characters at said reading line and producing images of said characters in an image focal plane, means on said supporting means to guide and position photo-sensitive sheet record material in the image focal plane of said optical means, said exterior electrode shielding said illumination from said sheet record material, developer applying means carried on said support in position to apply developer to the exposed surface of said sheet record material as it is withdrawn from said record material guiding and positioning means, and means to operate said illuminating means.

2. Device for producing easily directly readable photo-records of data indications displayed at a datum line by a multiplicity of aligned indexable carriers of visual datum characters, comprising a support, means on said support to contain a supply of photo-sensitive strip of a width at least equal to the length of said datum line, a lens for each of said carriers, means on said support to support said lenses with their optical axes in a common plane and each intersecting a respective one of said carriers at said datum line, said lenses having an aperture of the order of the size of said characters, and an equivalent focal length of the order of a small multiple of the diameter of said aperture, and being positioned to produce in a common plane at substantially minimum distance from said datum line, images of those characters of the respective carriers which are positioned at said datum line, guide means on said support to guide the photo-sensitive strip from said supply means with a photo-sensitive face thereof in said focal plane, an electronic flash tube, means on said support to removably hold said flash tube substantially parallel to said datum line at approximately the same distance therefrom as the entrance surfaces of said lenses and at one side of the latter, a developing solution carrier and applicator, and means on said support to support the latter for contact with said sensitive face of said strip adjacent to said guide means at the side of the latter opposite from said supply means.

3. In combination with the device of claim 2, relatively short focus auxiliary plano-convex lenses having their plane faces in contact with the datum characters of said carriers and of an aperture at least as great as the maximum dimension of said characters.

4. A device in accordance with claim 2, for use with a photo-sensitive record medium substantially insensitive to daylight and to common artificial illumination and having high sensitivity to radiation in the near ultra-violet region, and wherein said electronic flash tube has emission of a high intensity at a wave length within the range of high sensitivity of said medium.

5. A device according to claim 2, wherein said guide means includes an opaque portion extending across said sensitive face of the record medium in said focal plane, having apertures of a size to pass the images of said datum characters, and shielding from radiation from said flash tube substantially all of the remainder of record medium extending from said supply means to said developer applicator.

FRANK G. DEDEK.

References Cited in the file of this patent

UNITED STATES PATENTS

| Number | Name | Date |
| --- | --- | --- |
| 1,396,770 | Mess | Nov. 15, 1921 |
| 2,219,667 | Szasy | Oct. 29, 1940 |
| 2,322,602 | Terry | June 22, 1943 |
| 2,355,268 | Bryce | Aug. 8, 1944 |
| 2,458,877 | Rose | Jan. 11, 1949 |
| 2,490,338 | Marin | Dec. 6, 1949 |

FOREIGN PATENTS

| Number | Country | Date |
| --- | --- | --- |
| 470,197 | Great Britain | Aug. 11, 1937 |